United States Patent [19]
Chen et al.

[11] Patent Number: 5,976,429
[45] Date of Patent: Nov. 2, 1999

[54] PROCESS FOR PRODUCING DENSE, SELF-SINTERED SILICON CARBIDE/CARBON-GRAPHITE COMPOSITES

[75] Inventors: Xin E. Chen; Mark E. Pfaff, both of St. Marys, Pa.

[73] Assignee: The Morgan Crucible Company, PLC, Berkshire, United Kingdom

[21] Appl. No.: 08/335,446

[22] Filed: Nov. 7, 1994

Related U.S. Application Data

[62] Division of application No. 08/017,735, Feb. 10, 1993, Pat. No. 5,422,322.

[51] Int. Cl.⁶ .................................................. C01B 31/00
[52] U.S. Cl. ........................................ 264/29.6; 264/29.7
[58] Field of Search ................................ 264/29.1, 29.6, 264/29.7

[56] References Cited

U.S. PATENT DOCUMENTS

| | | | |
|---|---|---|---|
| Re. 30,286 | 5/1980 | Coppola et al. | 264/65 |
| 2,609,318 | 9/1952 | Swentzel | 154/43 |
| 2,614,946 | 10/1952 | Proudfoot | 117/100 |
| 2,614,947 | 10/1952 | Heyroth | 117/106 |
| 2,636,826 | 4/1953 | Nicholson | 108/44 |

(List continued on next page.)

FOREIGN PATENT DOCUMENTS

| | | | |
|---|---|---|---|
| 0145496 | 3/1989 | European Pat. Off. | |
| 0 417 292 | 3/1991 | European Pat. Off. | |
| 0686336 | 5/1992 | European Pat. Off. | C04B 38/00 |
| 0500647 | 8/1992 | European Pat. Off. | C04B 35/56 |
| 0522945 | 1/1993 | European Pat. Off. | C04B 61/82 |

(List continued on next page.)

OTHER PUBLICATIONS

*Chemical Abstracts*, vol. 108, 155356 (May 2, 1988).
*Chemical Abstracts*, vol. 110, 159286 (May 1, 1989).
*Chemical Abstracts*, 110, 178331 (May 15, 1989).

"Sintered Alpha Silicon Carbide Pump Bearings–Tribological Materials Optimization to Improve Reliability," by H. Knoch, J. Kracker and W. Long, Proceedings of the Tenth International Pump Users Symposium, Mar. 1993.

"Sintered Silicon Carbides with Controlled Porosity for Mechanical Face Seal Applications," by R. Divakar, STLE Lubrication, Journal of the Society of Tribologists and Lubrication Engineers, vol. 50, pp. 75–80, Presented at 48th Annual Meeting in Calgary, Alberta, Canada May 17–20, 1993.

Quaterly Progress Report. No. 1, Report No. SRD–74–057, of contract N62269–74–C–0255, entitled "Investigation of Ceramics for High–Temperature Turbine Vanes," covering work performed from Jan. 23, 1974 to Apr. 23, 1974.

(List continued on next page.)

*Primary Examiner*—Christopher A. Fiorilla
*Attorney, Agent, or Firm*—Kilpatrick Stockton; Dean W. Russell; Bruce D. Gray

[57] ABSTRACT

A dense, self-sintered silicon carbide/carbon-graphite composite material and a process for producing the composite material. The composite material includes a silicon carbide matrix, between 2 and 30 percent by weight carbon-graphite, and small amounts of sintering aids such as boron and free carbon. The silicon carbide has an average grain size between 2 and 15 $\mu$m, and the carbon-graphite has an average grain size between 10 and 75 $\mu$m, the average grain size of the carbon-graphite being greater than the average grain size of the silicon carbide. The composite material has a density of at least 80 percent of theoretical density as determined by the rule of mixtures for a composite material. This density is achieved with minimal microcracking at a high graphite loading with large graphite particles. The composite material exhibits good lubricity and wear characteristics, resulting in improved tribological performance. The process for producing the composite material uses a carbon-bonded graphite including at least 5 percent by weight carbon-precursor binder.

10 Claims, 5 Drawing Sheets

U.S. PATENT DOCUMENTS

| | | | |
|---|---|---|---|
| 2,691,605 | 10/1954 | Hediger | 117/62 |
| 2,784,112 | 3/1957 | Nicholson | 117/65 |
| 2,887,393 | 5/1959 | Taylor | 106/44 |
| 2,897,572 | 8/1959 | Hansen | 25/156 |
| 2,907,972 | 10/1959 | Schildhauer et al. | 338/332 |
| 2,916,460 | 12/1959 | Van Der Beck, Jr. | 252/516 |
| 2,941,962 | 6/1960 | Van Der Beck, Jr. | 252/518 |
| 3,035,325 | 5/1962 | Nicholson et al. | 25/157 |
| 3,051,564 | 8/1962 | Dremming | 75/53 |
| 3,094,679 | 6/1963 | O'Connor et al. | 338/330 |
| 3,108,887 | 10/1963 | Lenie et al. | 106/82 |
| 3,166,380 | 1/1965 | Kuhn | 23/208 |
| 3,175,884 | 3/1965 | Kuhn | 23/208 |
| 3,189,472 | 6/1965 | Taylor | 108/55 |
| 3,189,477 | 6/1965 | Shaffer | 117/46 |
| 3,205,043 | 9/1965 | Taylor | 23/208 |
| 3,252,827 | 5/1966 | Rose et al. | 117/201 |
| 3,305,372 | 2/1967 | Taylor | 106/55 |
| 3,372,305 | 3/1968 | Mikulec | 317/98 |
| 3,459,566 | 8/1969 | Wilson, Jr. et al. | 108/44 |
| 3,480,395 | 11/1969 | McMullen et al. | 23/208 |
| 3,513,019 | 5/1970 | Miller et al. | 117/123 |
| 3,520,667 | 7/1970 | Taylor | 51/295 |
| 3,765,300 | 10/1973 | Taylor et al. | 89/36 A |
| 3,796,564 | 3/1974 | Taylor et al. | 75/203 |
| 3,808,012 | 4/1974 | Bailey et al. | 106/44 |
| 3,852,099 | 12/1974 | Prochazka | 117/119 |
| 3,853,566 | 12/1974 | Prochazka | 106/44 |
| 3,859,399 | 1/1975 | Bailey et al. | 264/29 |
| 3,954,483 | 5/1976 | Prochazka | 106/44 |
| 3,960,577 | 6/1976 | Prochazka | 106/44 |
| 3,968,194 | 7/1976 | Prochazka | 264/65 |
| 3,969,124 | 7/1976 | Stewart | 106/56 |
| 3,993,602 | 11/1976 | Prochazka | 252/504 |
| 4,004,934 | 1/1977 | Prochazka | 106/44 |
| 4,023,975 | 5/1977 | Prochazka | 106/44 |
| 4,031,178 | 6/1977 | Johnson et al. | 264/65 |
| 4,041,117 | 8/1977 | Prochazka | 264/63 |
| 4,080,415 | 3/1978 | Coppola et al. | 284/65 |
| 4,081,284 | 3/1978 | Prochazka et al. | 106/44 |
| 4,107,319 | 4/1977 | Greskovich et al. | 106/55 |
| 4,108,929 | 8/1978 | Prochazka et al. | 264/29.1 |
| 4,109,050 | 8/1978 | Mohan et al. | 428/332 |
| 4,119,475 | 10/1978 | Prochazka et al. | 106/73.5 |
| 4,119,689 | 10/1978 | Prochazka et al. | 264/65 |
| 4,119,690 | 10/1978 | Prochazka et al. | 264/65 |
| 4,120,731 | 10/1978 | Hillig et al. | 106/44 |
| 4,120,827 | 10/1978 | Boos et al. | 252/512 |
| 4,122,140 | 10/1978 | Greskovich et al. | 264/65 |
| 4,122,155 | 10/1978 | Prochazka et al. | 423/344 |
| 4,123,286 | 10/1978 | Coppola et al. | 106/44 |
| 4,124,402 | 11/1978 | Greskovich et al. | 106/73.5 |
| 4,124,403 | 11/1978 | Greskovich et al. | 106/73.5 |
| 4,124,667 | 11/1978 | Coppola et al. | 264/29.5 |
| 4,135,937 | 1/1979 | Murata et al. | 106/44 |
| 4,135,938 | 1/1979 | Murata et al. | 106/44 |
| 4,141,948 | 2/1979 | Laskow et al. | 264/101 |
| 4,144,207 | 3/1979 | Ohnsorg | 260/23 S |
| 4,148,894 | 4/1979 | Hillig et al. | 428/242 |
| 4,150,998 | 4/1979 | Morelock | 106/44 |
| 4,179,299 | 12/1979 | Coppola et al. | 106/44 |
| 4,207,226 | 6/1980 | Storm | 280/38 |
| 4,209,474 | 6/1980 | Prochazka | 264/29.5 |
| 4,225,356 | 9/1980 | Prochazka et al. | 108/73.5 |
| 4,233,256 | 11/1980 | Ohnsorg | 264/44 |
| 4,237,085 | 12/1980 | Smoak | 264/65 |
| 4,238,433 | 12/1980 | Hillig et al. | 264/60 |
| 4,240,835 | 12/1980 | Laskow et al. | 106/44 |
| 4,279,656 | 7/1981 | Greskovich et al. | 106/73.5 |
| 4,294,788 | 10/1981 | Laskow et al. | 264/101 |
| 4,312,954 | 1/1982 | Coppola et al. | 501/90 |
| 4,327,186 | 4/1982 | Murata et al. | 501/92 |
| 4,332,755 | 6/1982 | Murata | 264/65 |
| 4,346,049 | 8/1982 | Coppola et al. | 264/65 |
| 4,374,792 | 2/1983 | Prochazka et al. | 264/65 |
| 4,379,110 | 4/1983 | Greskovich et al. | 264/65 |
| 4,385,020 | 5/1983 | Morelock | 264/62 |
| 4,419,161 | 12/1983 | Hailey | 156/89 |
| 4,455,385 | 6/1984 | Prochazka | 501/90 |
| 4,524,138 | 6/1985 | Schwetz et al. | 501/90 |
| 4,525,461 | 6/1985 | Boecker et al. | 501/90 |
| 4,530,808 | 7/1985 | Renlund et al. | 254/63 |
| 4,551,436 | 11/1985 | Johnson et al. | 501/90 |
| 4,551,496 | 11/1985 | Renlund et al. | 524/322 |
| 4,554,717 | 11/1985 | Vig et al. | 29/25.35 |
| 4,571,414 | 2/1986 | Renlund et al. | 524/322 |
| 4,649,022 | 3/1987 | Tischer et al. | 419/24 |
| 4,659,002 | 4/1987 | Wallgren et al. | 228/8 |
| 4,666,775 | 5/1987 | Kim et al. | 428/398 |
| 4,676,940 | 6/1987 | Kim et al. | 264/65 |
| 4,690,909 | 9/1987 | Okuno et al. | 501/90 |
| 4,692,418 | 9/1987 | Boecker et al. | 501/90 |
| 4,693,988 | 9/1987 | Boecker et al. | 501/89 |
| 4,908,340 | 3/1990 | Frochette et al. | 501/95 |
| 4,932,438 | 6/1990 | Kitamura et al. | 137/625.17 |
| 5,114,886 | 5/1992 | Tsukada | 501/88 |
| 5,135,893 | 8/1992 | Dohi et al. | 501/91 |

FOREIGN PATENT DOCUMENTS

| | | | |
|---|---|---|---|
| 22 34 924 | 1/1974 | Germany . | |
| 33 29 225 | 2/1984 | Germany . | |
| 62-132785 | 6/1987 | Japan | C04B 41/83 |
| 62-138377 | 6/1987 | Japan | C04B 41/87 |
| 6282047 | 6/1987 | Japan | B41J 3/10 |
| 63-011559 | 1/1988 | Japan . | |
| 63-9781 | 1/1988 | Japan | F16K 3/02 |
| 63-26421 | 2/1988 | Japan | F16C 33/30 |
| 63-92915 | 4/1988 | Japan | G02B 26/10 |
| 63-163026 | 7/1988 | Japan | F16C 33/24 |
| 63-186076 | 8/1988 | Japan | F16K 1/34 |
| 63-260861 | 10/1988 | Japan . | |
| 63-265850 | 11/1988 | Japan . | |
| 6437468 | 2/1989 | Japan | C06B 35/56 |
| 1172290 | 7/1989 | Japan | C04B 41/88 |
| 225581 | 1/1990 | Japan | C23C 22/78 |
| 2150026 | 6/1990 | Japan | H01L 21/302 |
| 2192466 | 7/1990 | Japan | C06B 35/56 |
| 31276 | 1/1991 | Japan | G06F 15/28 |
| 34511 | 1/1991 | Japan | H01G 9/02 |
| 59-92560 | 1/1991 | Japan . | |
| 365577 | 3/1991 | Japan | C04B 41/50 |
| 3215374 | 9/1991 | Japan | C04B 38/00 |
| 3215375 | 9/1991 | Japan | C04B 38/06 |

OTHER PUBLICATIONS

Semi–Annual Technical Report No. SRD–75–047 of contract N00014–74–C–0331, entitled "Ceramic Sintering" dated Apr. 1975.

Quaterly Progress Report No. 2, Report No. SRD–75–042, of contract N62269–75–C–0122, entitled "Investigation of Ceramics for High–Temperature Turbine Vances," covering work performed from Jan. 19, 1975 to Apr. 18, 1975.

Pure Industries, Inc., Pure Carbon Co., Brochure entitled "The Carbon Component Specialist".

Pure Industries, Inc., Pure Carbon Co., Brochure entitled "Rubbing Components for Mechanical Seals".

Pure Industires, Inc., Pure Carbon Co., Brochure entitled "Bearings for Difficult Applications".

Pure Industries, Inc., Pure Carbon Co., Brochure entitled "Purebide Components for Demanding Applications".

Investigation of Ceramics for High Temperature Turbine Vanes Final Report, Mar. 1972, by Svante Prochazka, prepared under Contact N00019–71–C–0290 for Department of Navy.

"Investigation of Ceramics for High Temperature Turbine Vanes" Final Report, Dec. 1972, by Svante Prochzka, prepared under Contract N00019–72–C–0129 for Department of Navy.

"Investigation of Ceramics of High Temperature Turbine Vanes" Final Report, Mar. 20, 1973—Dec. 19, 1973, by Svante Prochazka & Peter C. Smith, prepared under Contract N62269–73–C–0356 for Department of Navy.

"Investigation of Ceramics of High Temperature Turbine Vanes" Final Report, Jan. 23, 1974—Oct. 23, 1974, by Svante Prochazka et al., prepared under Contract N62269–74–C–0255 for Department of Navy.

Investigation of Ceramics for High Temperature Turbine Components—Final Report Dec. 1975, by Svante Prochazka et al., prepared under Contract N62269–75–C–0122 for Department of Navy.

Investigation of Ceramics for High Temperature Turbine Components—Final Report, Mar. 25, 1976—Mar. 25, 1977, by Curtis A. Johnson et al., prepared under Contract N62269–76–C–0243 for Department of Navy.

"Substitution of Ceramics for Ductile Materials in Design" Report by J.A. Coppola et al., presented at National Symposium on "Ceramics in the Service of Man", Jun. 7, 1976.

"Beta Silicon Carbide" Report by Peter T. B. Shaffer, Materials Research Bulletin, vol. 4, pp. S97–S106, 1969, proceedings of Silicon Carbide International Conference, University Park, PA, Oct. 20–23, 1968.

"Problems in Silicon Carbide Device Development" Report by Peter T.B. Staffer, Materials Research Bulletin, vol. 4, pp. S13–S24, 1969, proceedings of Silicon Carbide International Conference, University Park, PA, Oct. 20–23, 1968.

"Phase Stability of Silicon Carbide in the Temary System Si–C–N" Report by A.R. Kieffer et al. Material Research Bulletin, vol. 4, pp. S153–S166, 1969, proceedings of Silicon Carbide International Conference, University Park, PA, Oct. 20–23, 1968.

"5.2.3 Silicon Carbide." pp. 5.2.3–1–5.2.3.–11.

Silicon Carbide—1973, edited by R.C. Marshall et al., pp. 343–402 420–426, University of Smith Carolina Press, 1974.

| TEST BAKE NO. | GRAPHITE WT. % | GRAPHITE SOURCE | GRAPHITE SIZE | SiC FORMULATION | SINTERING TEMP. DEG. C | FINAL DENSITY G/CC | WATER ABSORPTION % | REMARKS |
|---|---|---|---|---|---|---|---|---|
| 1 | 4.6% | KS6 | UNSIZED | 90.25% β-SiC, 4.75% α-SiC | 2070 | 2.95 | 0.12% | |
| 2 | 8.7% | KS6 | UNSIZED | " | 2070 | 2.79 | 1.48% | |
| 3 | 16.0% | KS6 | UNSIZED | " | 2070 | 2.56 | 4.80% | |
| 4 | 22.2% | KS6 | UNSIZED | " | 2070 | 2.28 | 8.59% | |
| 5 | 15% | KS150 | -70, +100 MESH | " | | | | UNABLE TO MOLD, LAMINATION |
| 6 | 15% | KS150 | -100, +200 MESH | " | | | | UNABLE TO MOLD, LAMINATION |
| 7 | 15% | KS150 | -200, +325 MESH | " | 2090 | 2.45 | 6.02% | |
| 8 | 15% | KS150 | -325 MESH | " | 2090 | 2.49 | 5.00% | |
| 9 | 4.6% | MIX NO.1 | UNSIZED | " | 2070 | 3.03 | 0 | |
| 10 | 8.7% | MIX NO.1 | UNSIZED | " | 2070 | 2.83 | 1.18% | |
| 11 | 16.0% | MIX NO.1 | UNSIZED | " | 2070 | 2.78 | 0.21% | LAMINATION |
| 12 | 22.2% | MIX NO.1 | UNSIZED | " | 2070 | 2.48 | 3.8% | SLIGHT LAMINATION |
| 13 | 15% | MIX NO.1 | UNSIZED | " | 2090 | 2.63 | 0.72% | |
| 14 | 15% | MIX NO.1 | -200, +325 MESH | " | 2090 | 2.65 | 1.08% | |
| 15 | 15% | MIX NO.1 | -100, +325 MESH | " | 2090 | 2.73 | 2.38% | |
| 16 | 15% | MIX NO.1 | -200 MESH | " | 2090 | 2.74 | 0 | |
| 17 | 15% | MIX NO.1 | -325 MESH | " | 2090 | 2.75 | 0 | |
| 18 | 15% | MIX NO.1 | -325 MESH | 100% α-SiC | 2090 | 2.80 | 0 | |

*FIG. 2*

50X
(a) T.B.#11, 16wt % UNSIZED 10042 GRAPHITE, 50X 50X
(b) T.B.#17, 15wt % 10042 GRAPHITE, -325 MESH, 50X

PROCESS FOR PRODUCING DENSE, SELF-SINTERED SILICON CARBIDE/CARBON-GRAPHITE COMPOSITES

This application is a division of application Ser. No. 08/017,735, filed Feb. 10, 1993 now U.S. Pat. No. 5,422,322.

FIELD OF THE INVENTION

This invention relates to the field of silicon carbide/graphite composite materials and more particularly to dense, self-sintered silicon carbide/graphite composite materials.

BACKGROUND OF THE INVENTION

Silicon carbide is hard, strong, and exhibits good corrosion and abrasion resistance and high thermal conductivity. It can be used in oxidizing temperatures up to 2500° F. These properties render silicon carbide a useful material in many acid, caustic, corrosive, abrasive, or high temperature environments. Such applications include pump seals and bearings, gas turbine components, mixing nozzles, and flame holders.

Silicon carbide bodies are frequently formed by a sintering process. Sintered silicon carbide has a high hardness, good corrosion resistance, and high thermal conductivity. In sintering, particles of a material bond together when heated to a high temperature, below the material's melting point. In some processes, the material is also subjected to high pressure as well. A self-sintered process is one which does not require application of pressure during the heating step for sintering to occur.

A drawback to silicon carbide is its lack of self-lubricity. A self-lubricating solid is one having low friction in the absence of an additional lubricant. For example, in applications having a high PV (pressure-sliding velocity) limit or dry running applications, parts, such as seals, having a silicon carbide face adjoining a face made of silicon carbide, other ceramics, or steel, will wear excessively due to the forces generated by the high friction. In dry running applications with mating surfaces, special wear surfaces must be provided on at least one of the bodies.

Graphite is a known lubricant and has been incorporated into carbon and silicon carbide materials to impart a self-lubricating property to the material. However, with sintered materials, it has been difficult to incorporate large amounts of a second phase such as graphite into a ceramic matrix without causing cracks to occur in the microstructure or without increasing the material's porosity. Further, adding graphite to silicon carbide is even more difficult, because sintering of silicon carbide already requires stringent conditions, such as fine, high purity powders, sintering aids, and high temperature.

It is known to form a silicon carbide/graphite material by reaction bonding or reaction sintering. However, reaction bonded silicon carbide/graphite material typically has a residual silicon phase which limits corrosion resistance due to reaction with the silicon in some chemical applications. Also, controlling the reaction bonding process to obtain fully reacted and fully dense parts is difficult.

Another known silicon carbide material incorporating graphite is disclosed in U.S. Pat. No. 4,525,461. This material comprises a sintered silicon carbide/graphite/carbon composite ceramic body having a homogeneous fine grain microstructure. At least 50% of the silicon carbide grains are less than 8 $\mu$m, and the graphite grains have an average size no larger than that of the silicon carbide grains. However, if the amount of graphite is greater than approximately 8% by weight in this material, the material's density decreases. Less than 8% by weight graphite, while providing a more dense, impervious structure, limits the graphite's lubricating capability in the material.

Thus, there exists a need for a dense, impervious self-sintered silicon carbide body with a greater amount of graphite inclusions to increase the lubricity of the material while maintaining the integrity of the microstructure.

SUMMARY OF THE INVENTION

The composite material of the present invention provides a dense, self-sintered silicon carbide/carbon-graphite composite material while incorporating larger amounts of graphite, leading to increased lubricating capability, and maintaining the integrity of the microstructure. The composite material comprises a silicon carbide matrix, between 2 and 30 percent by weight carbon-graphite, and small amounts between 0.1 and 15 percent by weight, of sintering aids such as boron and free carbon. The silicon carbide has an average grain size between 2 and 15 $\mu$m, and the carbon-graphite has an average grain size between 10 and 75 $\mu$m, the average grain size of the carbon-graphite being greater than the average grain size of the silicon carbide. The composite material has a theoretical density of at least 80 percent and preferably at least 90 percent as determined by the rule of mixtures for a composite material.

The composite body is formed by providing a particulate mixture of silicon carbide, graphite coated with a carbon-precursor binder, and sintering aids. The carbon-bonded graphite comprises at least 5 percent by weight of a carbon-precursor binder, such as a phenolic resin. The silicon carbide may comprise $\alpha$-silicon carbide, $\beta$-silicon carbide, or a combination of both. A binder, a sintering aid, and other temporary additives are also generally present in the particulate mixture.

The mixture is shaped to form a green body. The green body is heated to carbonize the carbon-precursor binder. The carbonized body is then sintered at a temperature ranging from 1900° C. to 2300° C. in a substantially inert atmosphere at or below atmospheric pressure to produce a sintered body having a theoretical density of at least 80 percent and a microstructure in which the average grain size of the carbon-graphite is larger than the average grain size of the silicon carbide.

DESCRIPTION OF THE DRAWINGS

The invention will be more fully understood from the following detailed description taken in conjunction with the accompanying drawings in which:

FIG. 2 is a table of test results;

DETAILED DESCRIPTION OF THE INVENTION

The composite material of the present invention provides a dense, self-sintered silicon carbide/carbon-graphite composite material which also incorporates large amounts of graphite, leading to increased lubricating capability. The integrity of the microstructure, i.e., relative absence of cracks and porosity, is also maintained.

The composite material comprises silicon carbide, between 2 and 30 percent by total material weight carbon-graphite, and between 0.1 and 15 percent by total material weight sintering aids, such as boron and free carbon. The carbon-graphite comprises particles of graphite coated with carbon. The average grain size of the carbon-graphite is greater than the average grain size of the silicon carbide. The silicon carbide has an average grain size between 2 and 15 $\mu$m. The carbon-graphite has an average grain size between 10 and 75 $\mu$m and preferably between 20 and 30 $\mu$m. The composite material has a theoretical density of at least 80 percent, and preferably at least 90 percent, as determined by the rule of mixtures for a composite material.

Figure 1:
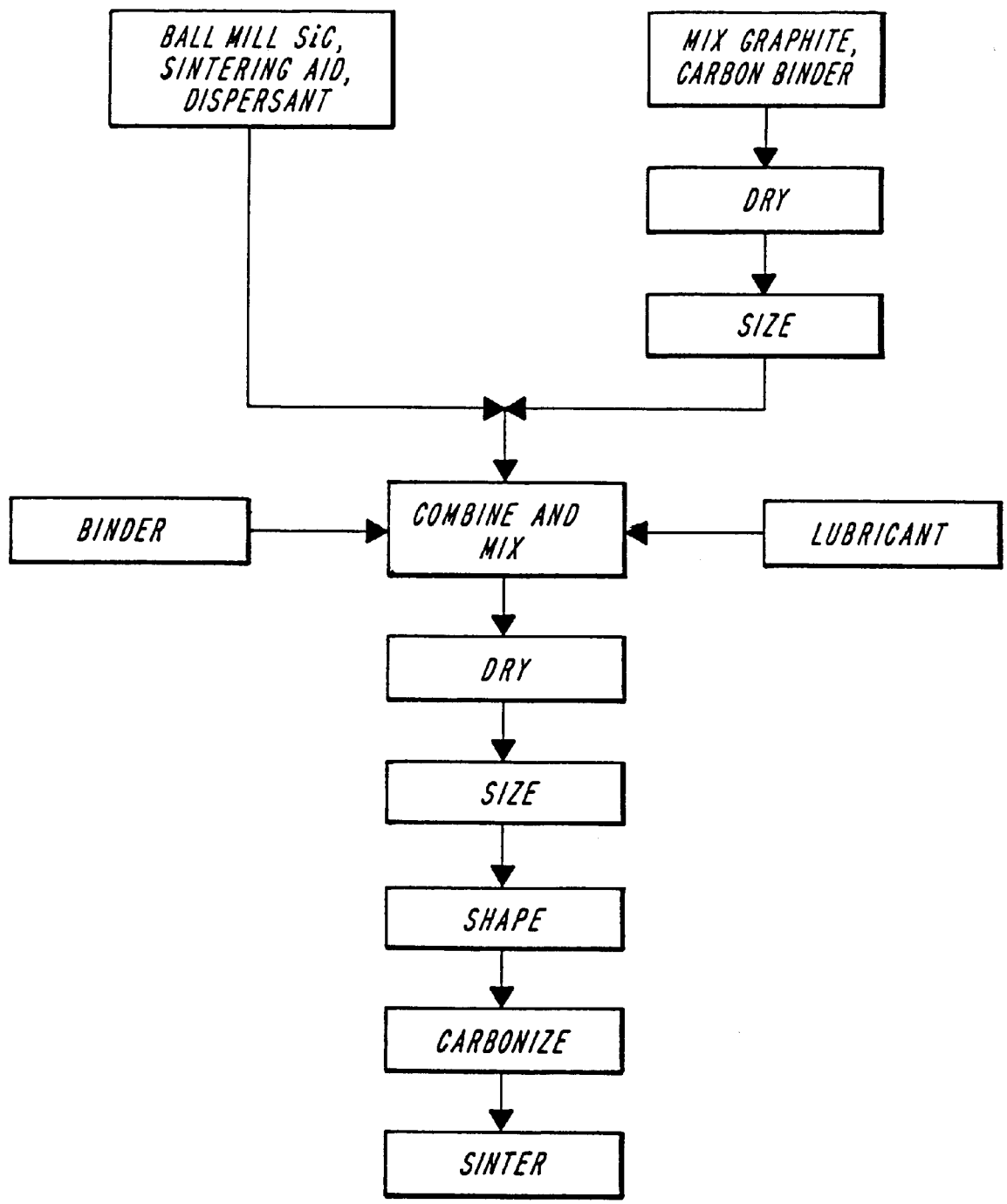
FIG. 1 is a schematic illustration of the process for producing a dense, self-sintered silicon carbide/carbon-graphite composite material according to the present invention.

The process for producing the dense, self-sintered composite material of the present invention is shown schematically in FIG. 1. The composite body is formed from a particulate mixture of a silicon carbide matrix formulation and a carbon-bonded graphite. The carbon binder for the graphite comprises a carbon-precursor resin capable of leaving a carbon residue upon heating, to be described more fully below.

The silicon carbide matrix formulation may comprise a fine-grained, high purity $\alpha$-silicon carbide, $\beta$-silicon carbide, or a combination thereof. Preferably, at least 0.5 percent $\alpha$-silicon carbide relative to $\beta$-silicon carbide is present to achieve better densification. A formulation comprising approximately 90 to 91 percent $\beta$-SiC, 4 to 5 percent $\alpha$-SiC, and 5 percent resin binder has been found to provide satisfactory results. The $\alpha$-SiC and $\beta$-SiC may be supplied from any commercially available source.

Generally, a slurry of $\alpha$-SiC and $\beta$-SiC in distilled water is prepared. The SiC is typically provided in powder form and should be fine-grained, having a BET surface area of more than 5 $m^2$/g and preferably more than 10 $m^2$/g. Also, the powder should be of a high purity, generally at least 95 percent and preferably 97 percent pure. Typically, a sintering aid, such as boron or boron carbide, $B_4C$, is added to the SiC suspension. Other known sintering aids, such as aluminum or beryllium or compounds thereof, may be provided if desired. Alternatively, a sintering aid may be introduced at other known steps in the process of forming a sintered composite body. A dispersant, for example, ammonium polymethacrylate, is generally added to the slurry. The dispersant is a temporary additive not forming part of the final composite body. The slurry is mixed, for example, in a ball mill for a period of time, typically about eight hours, sufficient to disperse the ingredients. The slurry is then transferred to a mixing tank.

The carbon-bonded graphite is prepared for addition to the SiC slurry. It comprises at least 5 percent by weight of a carbon binder, the balance comprising a coarse graphite. In the preferred embodiment, a mixture of approximately 70 to 80 percent graphite and 20 to 30 percent binder is provided. A greater amount of binder may be used, although the lubricating capability of the graphite in the final composite body may be reduced.

A coarse graphite such as Lonza KS-150, available from Lonza, Inc., Fairlawn, N.J., in which 55 percent of the particles are larger than 45 $\mu$m, is suitable. A suitable binder is a phenolic resin, although other materials which will decompose upon heating to leave a carbon residue, such as furfuryl alcohol, polyester resin, coal tar pitch, or mixtures of these and other materials, may be used. Upon decomposition, the binder causes an increase in the porosity of the graphite particles, as discussed further below.

The binder in powdered form is dissolved in acetone or any other suitable solvent and mixed thoroughly with the graphite to bond the graphite particles. The mixture is dried to evaporate the solvent and crushed to obtain carbon-bonded graphite particles of the desired size. Preferably, the carbon-bonded graphite is passed through a 200-mesh sieve to obtain particles of less than 75 $\mu$m. The carbon-bonded graphite is then added to the mixing tank with the Sic slurry. The carbon-bonded graphite generally comprises between 2 and 30 percent by weight of the solids content of the mixture.

A resin solution in distilled water is also added to the mixing tank as a binder for subsequent shaping of the particulate mixture to form a green body. The resin, for example, phenolic resin, typically comprises 5 percent of the total SiC matrix formulation. Also, a die lubricant, such as oleic acid, is generally added in an amount equal to approximately 5 percent of the total SiC matrix formulation (SiC and resin binder). The die lubricant, which is also a temporary additive not forming a part of the final composite body, facilitates subsequent removal from the die in which the particulate mixture is shaped.

The resulting slurry is mixed thoroughly and dried. Typically, the slurry is spray dried to form spherical granules having an average size less than approximately 500 $\mu$m. Any other suitable methods for obtaining such granules may be used. For example, the slurry may be pan dried, crushed to obtain a flour, and passed through a sieve to obtain the desired particle size.

A measured amount of the particulate mixture is fed into a die and compacted, typically at pressures ranging between 2 to 20 tons/in$^2$, to the desired shape to form a green body. Any other suitable method of shaping the mixture may be employed. The shaped green body is carbonized in a non-oxidizing atmosphere above 700° F. In a typical carbonization cycle, the component is heated in an oven from room temperature to 350° F. during a half hour period and allowed to soak at that temperature for another half hour. The temperature is raised to 850° F. over a period of ten hours and held at 850° F. for five hours to carbonize the resin. The component is then cooled to room temperature. Other suitable carbonization cycles may be used.

Next, the carbonized body is sintered at a temperature ranging from 1900° C. to 2300° C., preferably 2000° C. to 2200° C., in a substantially inert atmosphere such as helium or argon at or below atmospheric pressure. Generally, the temperature is raised to the sintering temperature over an eight hour period, although the actual time depends on the particular furnace used. The furnace is held at the peak temperature for one hour and then allowed to cool to room temperature. Other suitable sintering cycles may be used. Additionally, the carbonization cycle and the sintering cycle may be carried out in separate furnaces or in a single furnace.

The process of the present invention results in a sintered composite body comprising between 55 and 97.9 percent by weight silicon carbide, between 2 and 30 percent by weight carbon-graphite, and between 0.1 and 15 percent by weight sintering aids. The material has a density of at least 80 percent, and preferably 90 percent, of the theoretical density of the particular mixture. This density may be achieved, since during carbonization, part of the carbon-precursor binder for the graphite volatilizes, leaving voids, while the remainder forms a coke residue on the graphite. Thus, the carbon-graphite particles at this stage have a greater porosity than graphite alone. Subsequently during sintering, the porous carbon-graphite collapses, allowing greater shrinkage of the SiC matrix despite the presence of the carbon-graphite inclusions. Thus, a relatively dense and impervious composite body results. The resulting composite body has a microstructure in which the average grain size of the carbon-graphite is larger than the average grain size of the silicon carbide. The average grain size of the carbon-graphite ranges between 10 and 75 $\mu$m, and the average grain size of the silicon carbide ranges between 2 and 15 $\mu$m. Preferably, the carbon-graphite has an average grain size between 20 and 30 $\mu$m.

Tests of several different compositions were performed according to the present invention. See FIG. 2. In test bake nos. 1–17, the silicon carbide matrix was provided by a mix consisting of 90.25 percent of a fine-grained $\beta$-SiC powder having a BET surface area of 13.5 to 18.5 m$^2$/g, 4.75 percent of a fine-grained $\alpha$-SiC having a BET surface area of 9.0 to 11.0 m$^2$/g, and 5.0 percent liquid phenolic resin. In test bake no. 18, the silicon carbide matrix was provided by 100 percent $\alpha$-SiC having a BET surface area of 15 m$^2$/g. B$_4$C was used as a sintering aid, comprising approximately one percent of the total mix. Oleic acid was added as a die lubricant in an amount comprising approximately 5.0 percent of the total mix. These components are readily available from known commercial sources.

Several grades of graphite were tested to determine which provided the best sinterability: a fine graphite in which 50 percent of the particles are smaller than 2.4 $\mu$m, a coarse graphite in which 55 percent of the particles are larger than 45 $\mu$m, and a coarse, resin-bonded graphite in which 50 percent of the particles are larger than 74 $\mu$m. The fine graphite used in the tests was Lonza KS-6, commercially available from Lonza, Inc. The coarse graphite used was Lonza KS-150, also commercially available from Lonza, Inc. The coarse, carbon-bonded graphite was specially mixed as described above and consisted of 20 percent by weight phenolic resin and 80 percent by weight Lonza KS-150.

In the tests, the composite body was formed by mixing a slurry of the silicon carbide with the graphite or carbon-bonded graphite. The mixture was dried and granulated and molded at 2 to 20 tons per square inch. The molded green body was carbonized at 850° F., and the carbonized body was sintered at temperatures of 2070° C. and 2090° C.

Test results are shown in FIG. 2. In some test bakes, the graphite was sieved prior to mixing with the silicon carbide to obtain a specific size range. This is indicated in the column "Graphite Size." The entry "Unsized" indicates that the graphite was not sieved. The sieved graphite is indicated by the appropriate size ranges. The specially mixed carbon-bonded graphite is designated Mix No. 1 in the column labeled "Graphite Type."

The tests show that samples containing large amounts of the commercially available non-carbon-bonded graphites, i.e., the fine graphite, Lonza KS6, and the coarse graphite, Lonza KS150, (Test Bake Nos. 3–8) did not provide satisfactory results. The resulting sintered samples were too porous, as indicated by the percent of water absorption, and did not achieve sufficient densification.

The samples using the specially mixed coarse, carbon-bonded graphite (Test Bake Nos. 9–17) indicate that greater densification was achieved with a graphite loading of 15 percent by weight than has been achieved in prior art composite bodies using a comparable loading of non-carbon-bonded graphite. Some lamination in removal from the die, leading to some water absorption, occurred using the larger graphite particles. Lamination did not occur when carbon-bonded graphite particles small enough to pass through the 200-mesh sieve, that is, less than 75 $\mu$m, were used.

Figure 3:
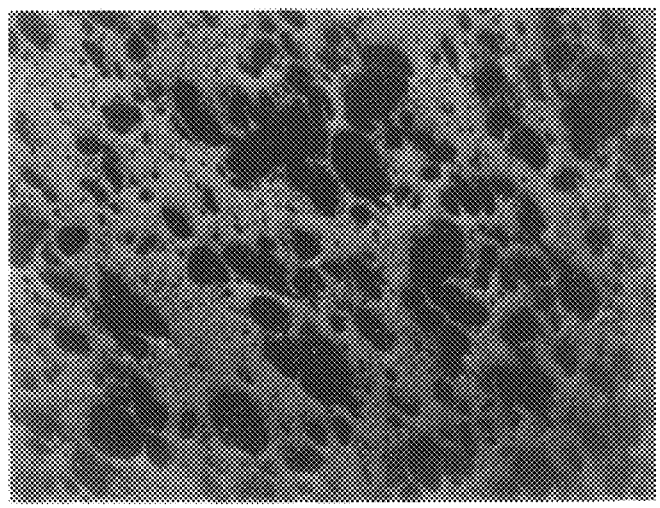
FIG. 3 is an optical photomicrograph at 50×magnification of a silicon carbide/carbon-graphite composite material according to the present invention.
Figure 4:
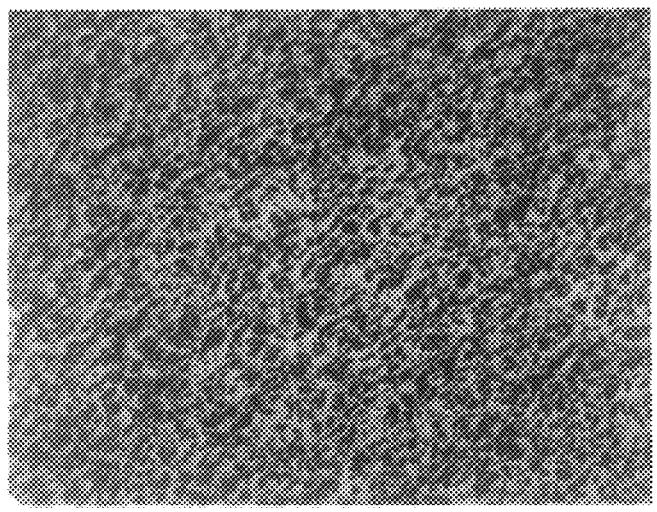
FIG. 4 is a further optical photomicrograph at 50×magnification of a silicon carbide/carbon-graphite composite material according to the present invention.
Figure 5A:
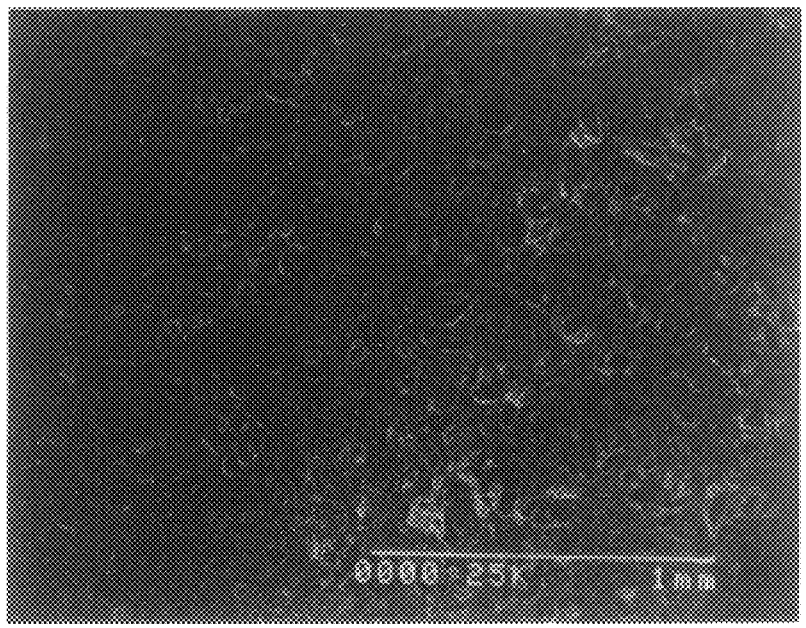
FIGS. 5a, 5b, 5c, and 5d are scanning electron micrographs at 50×, 500×, 1000×, and 2000×magnification respectively, of a further silicon carbide/carbon-graphite composite material according to the present invention.
Figure 5B:
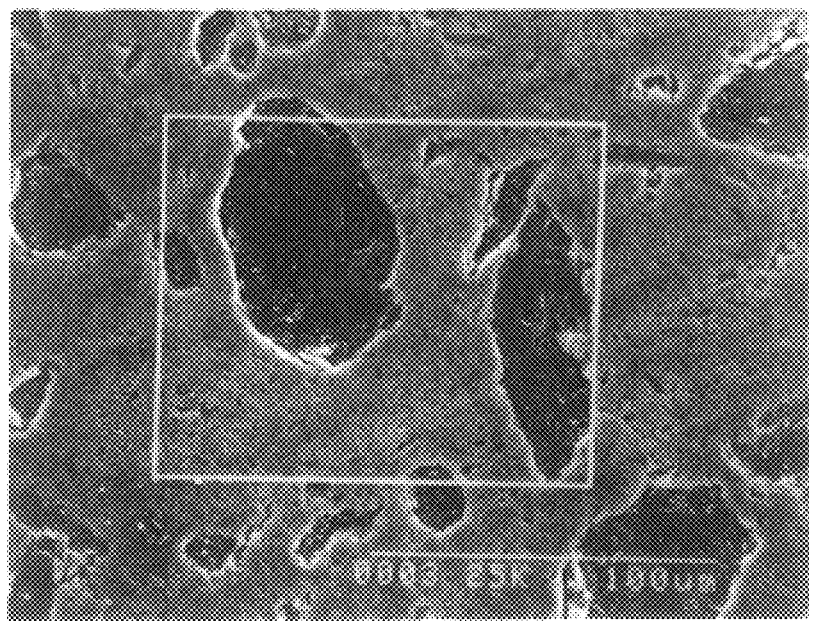
Figure 5C:
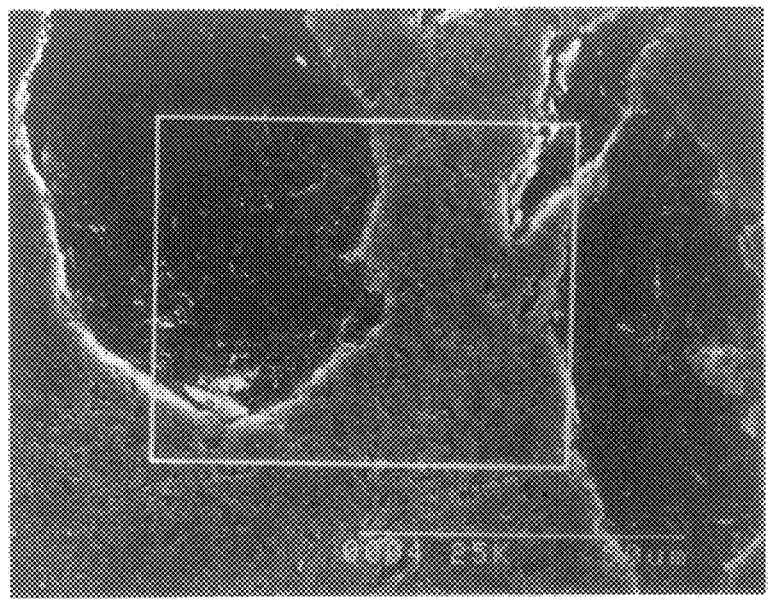
Figure 5D:
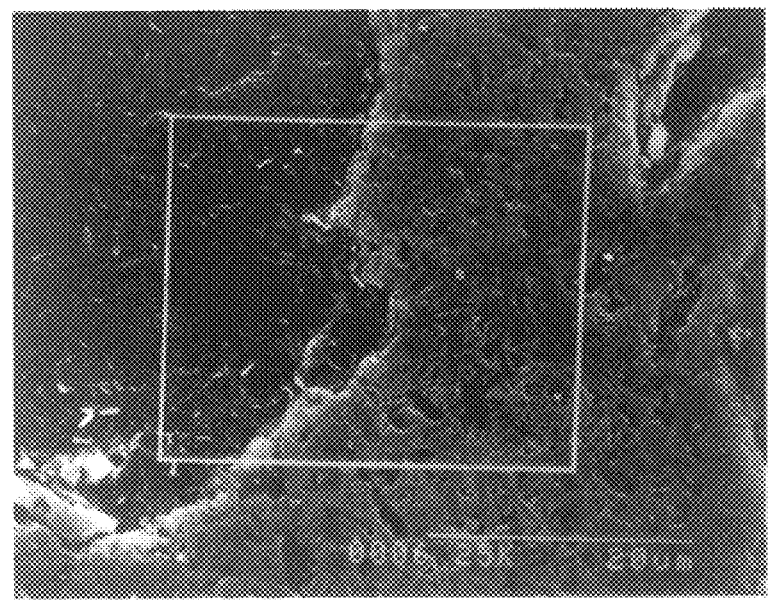

Silicon carbide/carbon-graphite composite materials according to the present invention are shown in the photomicrographs of FIGS. 3 through 5. The carbon-graphite appears as the darker inclusions among the lighter silicon carbide matrix. FIG. 3 shows an optical micrograph of a polished cross-section of test bake no. 11 magnified 50 times (50×). The material appears fully dense and the carbon-graphite is uniformly distributed.

FIG. 4 shows an optical micrograph of a polished cross-section of test bake no. 17 at 50×magnification. The material appears fully dense and the carbon-graphite is uniformly distributed.

FIGS. 5a through 5d show scanning electron micrographs at 50×, 500×, 1000×, and 2000×magnification respectively of test bake no. 17 polished and etched to show the grain structure. The grain size of the silicon carbide is less than 10 $\mu$m, and the carbon-graphite grain size is in the range of 20 to 60 $\mu$m.

The invention is not to be limited by what has been particularly shown and described, except as indicated in the appended claims.

We claim:

1. A process for producing a dense, self-sintered silicon carbide/carbon-graphite composite material comprising the steps of:
   (a) providing a particulate mixture comprising:
      (i) between 2 and 30 percent, based on the weight of the particulate mixture, of particles of bonded graphite, the bonded graphite comprising graphite particles coated with at least 5 percent by weight carbon-precursor binder, formed by mixing the graphite particles with the carbon precursor binder, drying the graphite/binder mixture, and optionally crushing the dried graphite/binder mixture,
      (ii) between 1 and 10 percent by weight of a green body binder,
      (iii) between 0.1 and 15 percent by weight of a sintering aid;
      (iv) between 1 and 5 percent by weight of a lubricant, and
      (v) silicon carbide;
   (b) shaping the mixture to form a green body bound by the green body binder,
   (c) heating the green body to a carbonizing temperature and maintaining said temperature for a time sufficient to carbonize the carbon-precursor binder; and subsequently
   (d) producing from the carbonized body a sintered body having a theoretical density of at least 80 percent and a microstructure in which the average grain size of the carbon-graphite is larger than the average grain size of the silicon carbide and in which the average grain size of the carbon graphite is at least 10 $\mu$m, by sintering the carbonized body at a temperature above the carbonizing temperature and ranging from 1900° C. to 2300° C. in a substantially inert atmosphere.

2. The process of claim 1, wherein the carbon-precursor binder comprises phenolic resin, furfuryl alcohol resin, polyester resin, coal tar pitch, or mixtures thereof.

3. The process of claim 1, wherein the carbonized body is sintered at a temperature ranging from 2100° C. to 2200° C.

4. The process of claim 1, wherein the carbon-bonded graphite has a particle size less than about 75 μm.

5. The process of claim 1, wherein the silicon carbide comprises at least 0.5 percent by weight α-silicon carbide, the balance being β-silicon carbide.

6. The process of claim 1, wherein the carbon-bonded graphite comprises between 20 and 30 percent by weight carbon-precursor resin and between 70 and 80 percent by weight graphite.

7. The process of claim 1, wherein the silicon carbide comprises approximately 95 percent by weight β-silicon carbide and approximately 5 percent by weight α-silicon carbide.

8. The process of claim 1, wherein the silicon carbide has a BET surface area less than 50 $m^2/g$.

9. The process of claim 1, wherein the silicon carbide has a BET surface area less than 20 $m^2/g$.

10. The process of claim 1, wherein the carbon-bonded graphite is prepared by providing a mixture of a coarse graphite and a carbon-precursor binder dissolved in a solvent, drying the mixture and crushing to obtain particles of less than 75 μm.

\* \* \* \* \*